United States Patent [19]

Sawaki

[11] 4,399,478
[45] Aug. 16, 1983

[54] FIXTURE DEVICE FOR MAGNETIC HEAD

[75] Inventor: Ryoichi Sawaki, Hachioji, Japan

[73] Assignee: Olympus Optical Company Ltd., Tokyo, Japan

[21] Appl. No.: 187,523

[22] Filed: Sep. 15, 1980

[30] Foreign Application Priority Data

Sep. 14, 1979 [JP] Japan .......................... 54/127381[U]

[51] Int. Cl.³ .......................... G11B 21/24; G11B 5/54
[52] U.S. Cl. ..................................... 360/109; 360/105
[58] Field of Search ....................... 360/109, 104–106, 360/96.1–96.4

[56] References Cited

U.S. PATENT DOCUMENTS

| | | | |
|---|---|---|---|
| 3,155,359 | 11/1964 | Hogan et al. | 360/109 |
| 3,729,202 | 4/1973 | Wakabayashi | 360/105 |
| 3,751,042 | 8/1973 | Platt | 360/96.1 |
| 3,761,644 | 9/1973 | Camras | 360/109 |
| 3,800,324 | 3/1974 | Nakamichi | 360/96.1 |
| 3,900,888 | 8/1975 | Uchikoshi et al. | 360/109 |
| 3,943,569 | 3/1976 | Bettini et al. | 360/109 |
| 4,052,745 | 10/1977 | Nakamichi | 360/109 |
| 4,071,861 | 1/1978 | Hirose | 360/96.4 |
| 4,158,212 | 6/1979 | Dattilo | 360/109 |
| 4,185,312 | 1/1980 | Bjordahl | 360/109 |

*Primary Examiner*—Alfred H. Eddleman
*Attorney, Agent, or Firm*—Toren, McGeady and Stanger

[57] ABSTRACT

A fixture for a magnetic head for use in a tape recorder is disclosed. In the fixture, a base plate is provided with a magnetic head. A rotating support member rotatably supports the base plate on a base member in response to a pressing force in the thrust direction, and a guide pin on the base member guides the base plate along the rotating direction.

19 Claims, 10 Drawing Figures

FIXTURE DEVICE FOR MAGNETIC HEAD

BACKGROUND OF THE INVENTION

The present invention relates to a fixture device for a magnetic head for stably obtaining azimuth adjustment of the magnetic head.

In superminiature tape recorders, a magnetic head, i.e., a recording and reproducing head is often fixed on a rotatable base plate (hereinafter referred to as a P lever), and the recording and reproducing head is made retractable by rotating the P lever, to permit various operations such as recording, reproduction or the like.

However, the rotary center of such a P lever is rotatably supported by a supporting shaft, so that the rotary center of the P lever is easily loosened, and a sliding portion is also loosened when rotating the P lever, and the gap position of the head to a tape, i.e., azimuth, is slightly dislocated by operation of the P lever. Therefore, even if the azimuth is adjusted, while the P lever is repeatedly operated, reproducibility of the azimuth is poor and thus stable recording and reproduction cannot be obtained.

SUMMARY OF THE INVENTION

It is an object of the present invention to eliminate the above mentioned disadvantages.

It is another object of the present invention to provide a fixture device for a magnetic head for stably maintaining azimuth adjustment for rotary operation of the P lever.

According to the present invention a fixture device for a magnetic head comprises a base member, a plate provided with a magnetic head thereon, a rotating support member for rotatably supporting the base plate on the base member under a pressing force in the thrust direction, and a guide pin provided on the base member for guiding the base plate in the rotating direction.

DESCRIPTION OF THE PREFERRED EMBODIMENT

Figure 1:
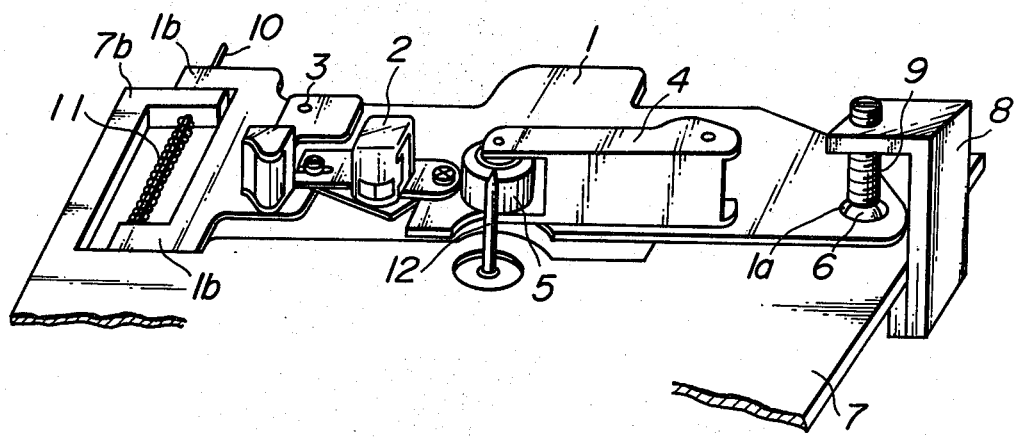
FIG. 1 is a perspective view showing one embodiment of a fixture device for a magnetic head according to the present invention.

Referring now to the drawings, wherein same reference characters designate same or corresponding parts throughout the several views, one embodiment of a fixture device for a magnetic head according to the present invention is explained below.

Figure 2:
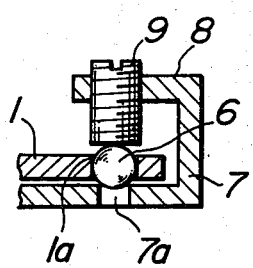
FIG. 2 is a fragmentary sectional view showing a P lever rotary supporting point of the fixture device shown in FIG. 1.
Figure 3:
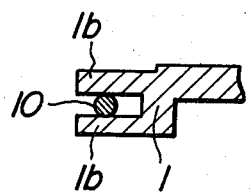
FIG. 3 is a fragmentary sectional view showing a relation between the P lever and a guide pin.

In FIG. 1 includes a base plate 1, i.e., P lever, provided, for example, with a magnetic recording reproducing head 2, and a tape guide 3, and a pinch roller 5 on a pinch roller lever 4. The P lever 1 is provided with a hole 1a around the center of rotation, and a ball 6 is forcibly inserted in the through-hole 1a and secured by means of adhesion or shrink fit. This structure is shown in FIG. 2. Moreover, the P lever 1 is provided with U-shaped projections 1b, 1b on both sides of the end opposite to the rotary center as shown in FIG. 3.

A base member 7 on a tape recorder is provided with a hole 7a at the portion for supporting the rotary center of the P lever 1 and is provided with an L-shaped standing portion 8. In this case, it is necessary that the diameter of the hole 7a is sufficiently smaller than the diameter of the ball 6. As shown in FIG. 2, the ball 6 of the P lever 1 is inserted into the through-hole 7a, while an adjust screw 9 is provided to the standing portion 8, and a rotating support portion for rotatably supporting the P lever 1 is constructed by pressing the upper portion of the ball 6 in the thrust direction with the adjust screw 9. The base member 7 is provided with an L-shaped projection 7b corresponding to the projections 1b, 1b of the P lever 1, and a guide pin 10 is secured between the projection 7b and the base member 7. The guide pin 10 is inserted into the U-shaped projections 1b, 1b of the P level 1 as shown in FIG. 3, and a return spring 11 is interposed between said projections 1b and 7b, so that the P lever 1 is made movable along the guide pin 10, while the P lever 1 is always positioned under the recording and reproducing state, i.e., in the counter-clockwise, direction, by the spring 11 in the illustrated embodiment.

Capstan shaft 12 is pressed to the pinch roller 5.

When recording and reproducing with this structure, the P lever 1 is rotated in the direction of biasing force of the spring 11 along the guide pin 10 around the center of the rotaring support point, and the pinch roller 5 is pressed against the capstan shaft 12. FIG. 1 shows this condition.

If a stop operation is now carried out, the P lever 1 is rotated in the clockwise direction along the guide pin 10 against the biasing force of the spring 11 around the center of the rotating support point by a driving force (not shown) and back to the stop position.

Consequently, the recording, reproducing and stop operations may be repeated, and the operation stopped by rotating the P lever 1 around the rotating support point, and retracting the recording and reproducing head 2 and the pinch roller 4.

In this case, the rotating support point of the P lever 1 is constructed by using the ball 6, which is supported by the through-hole 7a of the base member 7 and the adjust screw 9, so that any loosening of the support point can positively be prevented, and an operating load of the P lever when rotating can be minimized. Moreover, the rotation of the P lever occurs along the guide pin 10, so that any loosening in this portion can also be prevented. It means that all loosening accompanying the rotation of the P lever can be removed, thereby positively preventing the gap position of the head, i.e., the displacement of azimuth, to the tape, and obtaining good reproducibility of azimuth adjustment.

With such construction, even when the P lever is rotated, the azimuth adjustment can stably be maintained, so that the azimuth adjustment need be completed. As a result, construction can be simplified by a large margin, and recording and reproduction can stably be obtained.

The present invention is not limited to the above embodiment but can be modified without departing from the scope thereof.

Figure 4:
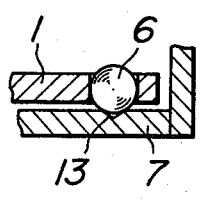
FIGS. 4 to 10 are fragmentary sectional views showing other embodiments of the P lever rotary supporting point of the fixture device according to the present invention.
Figure 5:
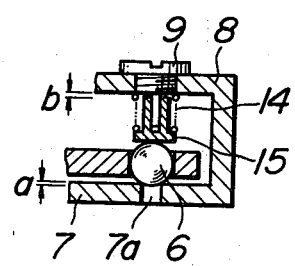
Figure 6:
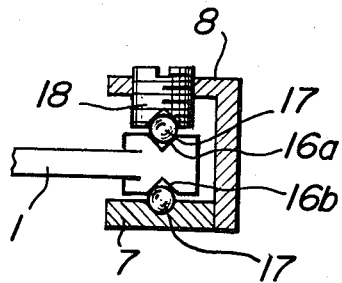
Figure 7:
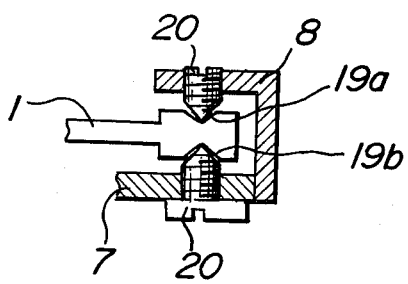
Figure 8:
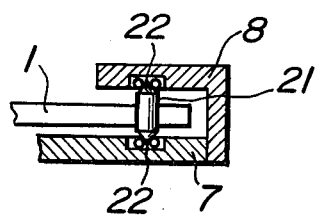
Figure 9:
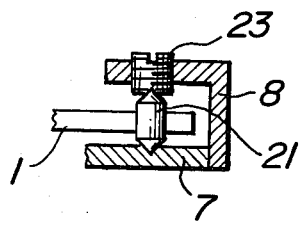
Figure 10:
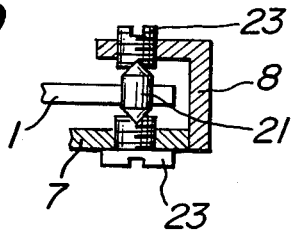

According to another embodiment, the rotary supporting portion of the P lever is, as shown in FIG. 4, a conical spot facing 13 is provided in the base member 7 to support the ball 6 of the P lever 1. Moreover, as shown in FIG. 5, the adjust screw 9 in the standing portion 8 is provided with a cap fitting 15 and a spring 14 to press the upper portion of the ball 6 of the P lever 1 in the thrust direction with the fitting. In this case, as b<a, it is necessary to prevent the P lever 1 from being moved out of the supporting point by an external shock. In the embodiment of FIG. 6, the P lever 1 is provided with conical spot facings 16a, 16b on both surfaces of its rotary center, and pressed by an adjust screw 18 through two balls 17. In this case, the top end of the adjust screw 18 is made ball-like and one ball 17 may be omitted. In FIG. 7, the P lever 1 is provided with conical spot facings 19a, 19b on both surfaces of its rotary center and these facings 19a, 19b are supported by a pair of cap screws 20, 20 which top ends are sharpened. In FIG. 8, the P lever 1 is provided at the rotary center thereof with a shaft 21 whose ends are sharpened, and the thus sharped ends of the shaft 21 are supported by pivot bearings 22, 22. As shown in FIGS. 9 and 10, one or both ends of the shaft 21 may be supported by two cap screws 23. Here, the same parts shown in FIGS. 5 to 10 are designated by the same reference numerals shown in FIG. 1.

As stated in the above, according to the present invention, it is possible to provide a fixture device for a magnetic head, wherein azimuth adjustment can stably be maintained against the rotating operation of the P lever.

What is claimed is:

1. A fixture for a magnetic head, comprising a base member, a base plate, a magnetic head on said base plate, a rotating support member for rotatably supporting the base plate on the base member, and a guide pin on the base member for guiding the plate in the rotating direction, said base plate defining a plane, said magnetic head defining a gap transverse to said plane, said base plate being rotatably movable along the plane so that said gap advances and retracts with movement of the plate, said pin guiding the plate along the plane.

2. A fixture for a magnetic head, comprising a base member, a base plate, a magnetic head on the base plate, rotating support means for rotatably supporting the base plate on the base member, and a guide pin on the base member for guiding the plate in the rotating direction, said rotating support means including a bearing member secured to said base plate for rotation with said base plate and defining bearing surfaces along an axis transverse to the base plate, said support means also including bearing means on the base member and coupled to the bearing surfaces for permitting rotation of said base plate.

3. A fixture as in claim 2, wherein said bearing member is in the shape of a ball and said bearing means include a recess for partially receiving said ball and means for urging said ball to said recess.

4. A fixture as in claim 3, wherein said recess is in the form of a hole.

5. A fixture as in claim 3, wherein said recess is conically shaped.

6. A fixture as in claim 2, wherein said bearing means includes a screw abutting against said ball.

7. A fixture as in claim 3, wherein said bearing means includes a screw abutting against said ball.

8. A fixture as in claim 2, wherein said bearing means includes a cap fitting abutting against said ball and a spring for urging said cap fitting against said ball.

9. A fixture as in claim 3, wherein said bearing means includes a cap fitting abutting against said ball and a spring for urging said cap fitting against said ball.

10. A fixture as in claim 2, wherein said bearing member includes recesses along an axis transverse to said plate, and wherein said bearing means includes means entering said recesses and allowing rotary movement of said bearing member.

11. A fixture as in claim 10, wherein said bearing means includes a pair of ball bearings between said recesses and said plate.

12. A fixture as in claim 11, wherein said bearing means further includes screw means for biasing said ball bearings into said recesses.

13. A fixture as in claim 10, wherein said bearing means includes a pair of conical screws entering said recesses.

14. A fixture as in claim 10, wherein said recesses are conical.

15. A fixture as in claim 2, wherein said bearing surfaces are conical and said bearing means include means for receiving the conical surfaces and allowing rotation of said base plate.

16. A fixture as in claim 15, wherein said bearing means include ball bearings.

17. A fixture as in claim 16, wherein said bearing means include a conical recess in said base plate and a biasing screw with a conical recess for receiving the conical bearing surfaces, said biasing screw being secured to said base plate.

18. A fixture as in claim 15, wherein said bearing means include a pair of screws with conical recesses for receiving the conical projections of said bearing member.

19. A fixture as in any one of claims 2 to 18, wherein said base plate defines a plane, said magnetic head forms a gap transverse to the plane, said base plate is rotatably movable along the plane so that said gap advances and retracts with movement of the plate, and said pin extends along the plane substantially tangential to the rotating direction and said plate is slidably connected to said pin for guiding the plate along the plane.

* * * * *